United States Patent [19]

Gabor

[11] 3,839,665

[45] Oct. 1, 1974

[54] APPARATUS MEASURING RELATIVE VELOCITY OF MOVABLE MEMBERS INCLUDING MEANS TO DETECT VELOCITY FROM THE POSITION ENCODER

[76] Inventor: Andrew Gabor, 371 Cardeel Dr., Danville, Calif. 94526

[22] Filed: June 28, 1971

[21] Appl. No.: 157,283

Related U.S. Application Data

[63] Continuation-in-part of Ser. No. 23,569, March 30, 1970, abandoned.

[52] U.S. Cl.................. 318/616, 318/618, 318/608, 318/660
[51] Int. Cl. ........................................... G05b 5/01
[58] Field of Search .......... 318/660, 661, 608, 618, 318/606, 616, 654

[56] References Cited
UNITED STATES PATENTS

| | | | |
|---|---|---|---|
| 2,615,149 | 10/1952 | Toomim........................... | 318/654 X |
| 2,674,729 | 4/1954 | Carter............................. | 318/660 X |
| 2,819,438 | 1/1958 | Sant-Angelo .................. | 318/608 X |
| 3,201,669 | 8/1965 | Hollmann ........................ | 318/616 |
| 3,259,819 | 7/1966 | Heiser............................. | 318/661 X |
| 3,379,944 | 4/1968 | Nuttall et al...................... | 318/606 |
| 3,460,130 | 8/1969 | Lavin.............................. | 318/661 X |
| 3,462,663 | 8/1969 | Schiller........................... | 318/606 |
| 3,539,897 | 11/1970 | Sommeria......................... | 318/618 |

Primary Examiner—T. E. Lynch

[57] ABSTRACT

A transducer coupled to a motor shaft provides both position and velocity information for use in a closed loop control system. The transducer includes a disk with deposited metallic parallel conductors each conductor carrying current in a direction opposite to the adjacent conductor. Relative movement of one disk with respect to another produces a position signal in a manner well known in the art. However, multiple windings are used to provide multiple position signals displaced in space phase which are then processed by differentiation and commutation to provide a velocity signal used as a control voltage in the control loop. A reference signal is also derived by commutation from the position signal.

20 Claims, 18 Drawing Figures

PATENTED OCT 1 1974
3,839,665
SHEET 1 OF 4
FIG_1
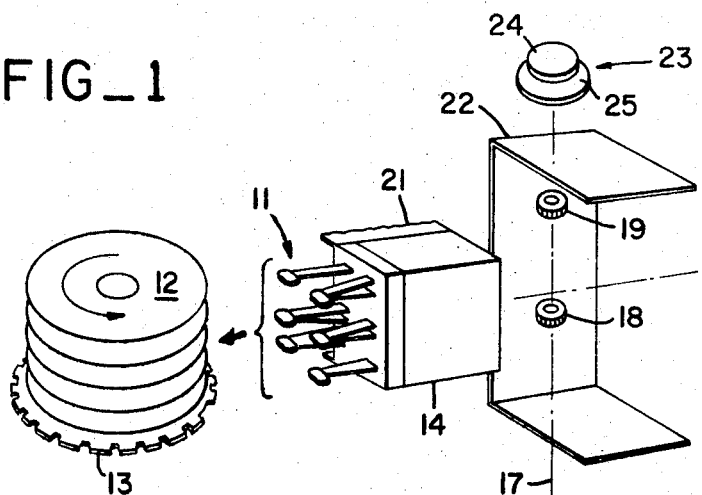
FIG_2
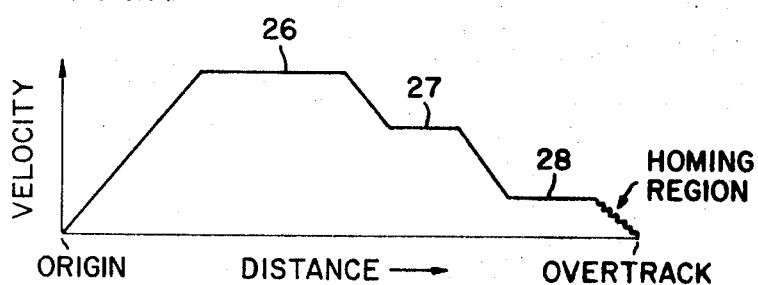
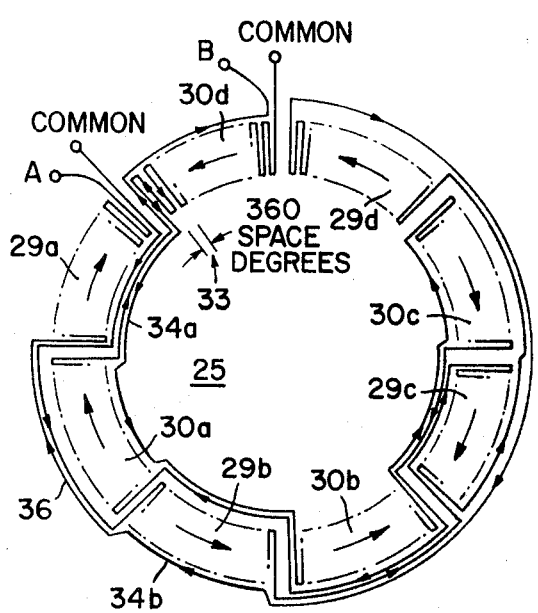
FIG_4
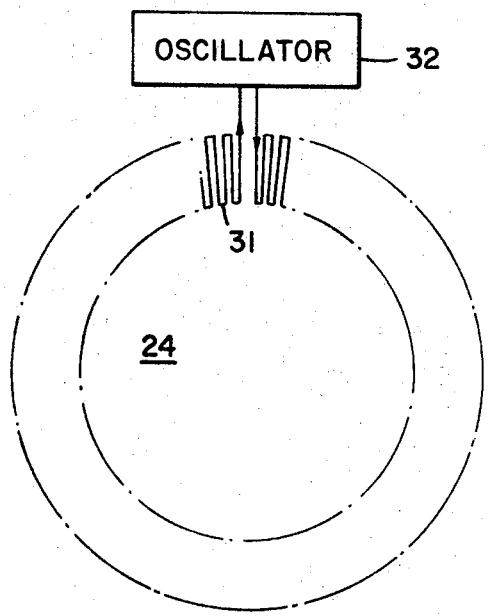
FIG_3
INVENTOR.
ANDREW GABOR
BY Flehr, Hohbach, Test
Albritton & Herbert
ATTORNEYS

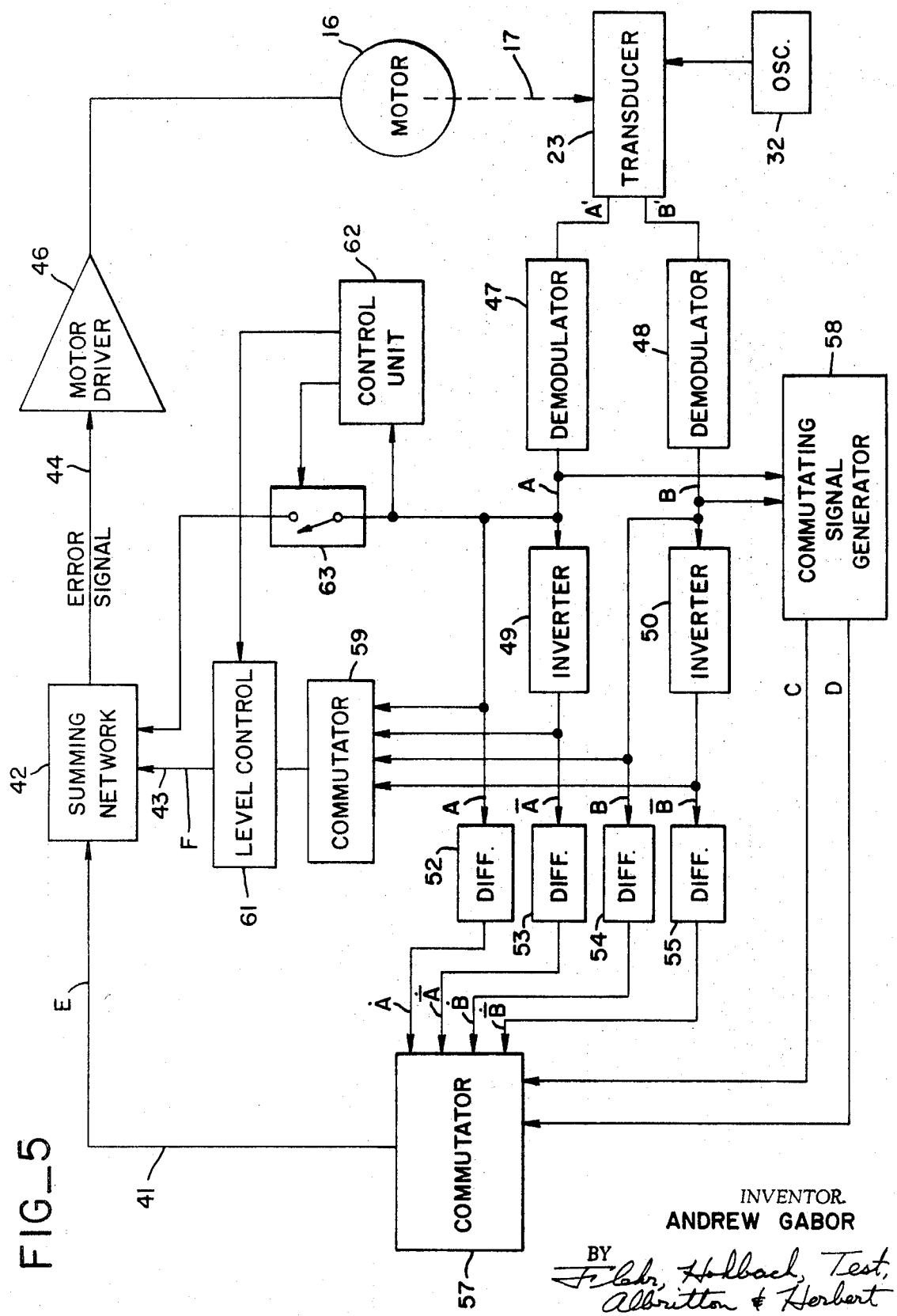

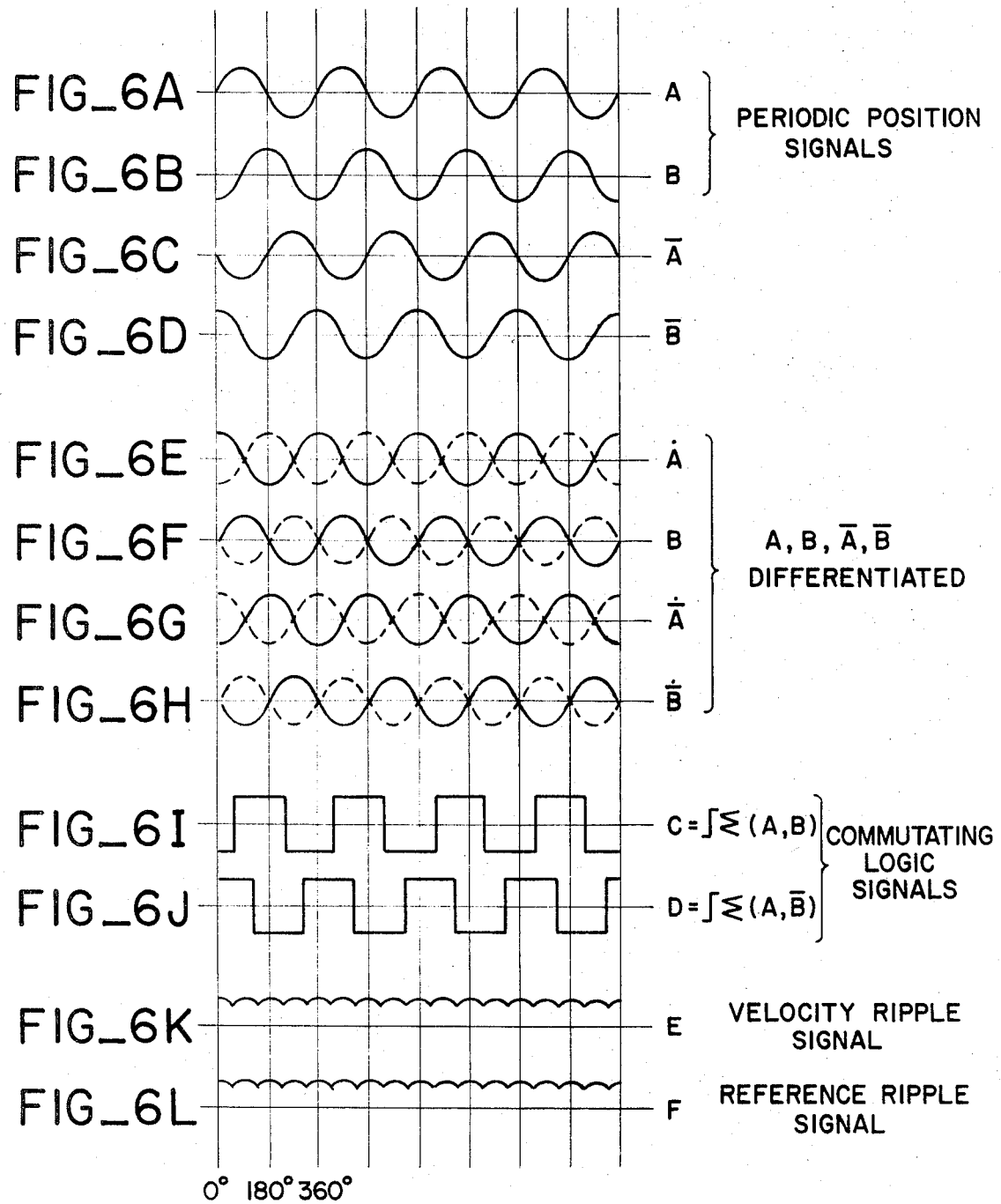

3,839,665

APPARATUS MEASURING RELATIVE VELOCITY OF MOVABLE MEMBERS INCLUDING MEANS TO DETECT VELOCITY FROM THE POSITION ENCODER

CROSS-REFERENCE TO RELATED APPLICATION

This application is a continuation-in-part of copending application, Ser. No. 23,569 filed Mar. 30, 1970, in the name of Andrew Gabor and now abandoned.

BACKGROUND OF THE INVENTION

The present invention is directed in general to apparatus for the measurement of relative velocity between two relatively movable members and more particularly where such apparatus is of the type where metallic patterns on insulating substrates are inductively coupled and move with the members.

Transducers of the foregoing type have been used in both open and closed loop control systems to provide position information only. One type of such device is known under the trademark INDUCTOSYN which is manufactured by Farrand Controls, Inc.

Where the system to be controlled operates at a significant velocity a separate tachometer has been provided. This was especially necessary in a closed loop system where the feedback of velocity information is necessary to insure stability.

However, a tachometer is objectionable in adding extra cost to the system. It also has relatively low mechanical reliability because of the need of bearings, flexible couplings and brushes.

OBJECTS AND SUMMARY OF THE INVENTION

It is, therefore, a general object of the present invention to provide an improved apparatus for the measurement of relative velocity.

It is another object of the invention to provide apparatus as above which in addition to velocity information provides position information.

It is another object of the invention to provide apparatus as above which eliminates mechanical coupling problems.

In accordance with the above objects there is provided apparatus for the measurement of relative velocity between two relatively movable members. The apparatus comprises a winding coupled to one of the members including a plurality of substantially parallel conductors each series connected to its next adjacent conductor whereby adjacent conductors of the winding carry currents in opposite directions. A winding is coupled to the other of the members including a plurality of substantially parallel conductors each series connected to its next adjacent conductor. Means are provided for applying an electrical signal to one of the windings. Means are also provides for juxtaposing the windings in an inductive relationship for producing an electric alternating position signal from the other winding in response to relative movement between the windings. The electric signal of the one winding induces the position signal in the other winding. The position signal has periods inversely proportional to the relative velocity between the members. The peak amplitude of the position signal if substantially constant with changes in velocity and the slope of the position signal at its zero crossing is proportional to instantaneous relative velocity. Means are provided for deriving from the slope information of the position signal a velocity signal.

BRIEF DESCRIPTION OF THE DRAWINGS

FIG. 1 is an exploded perspective view of a disk drive system which utilizes the present invention;

FIG. 2 is a curve illustrating the operation of the system of FIG. 1 in accordance with the present invention;

FIG. 3 is a plan view of a winding used in the present invention;

FIG. 4 is a plan view of another set of windings used in the present invention;

FIG. 5 is a block circuit diagram for the system of FIG. 1;

FIGS. 6A through 6L are curves useful in understanding the circuit of FIG. 5.

DETAILED DESCRIPTION OF THE PREFERRED EMBODIMENT

Figure 7:
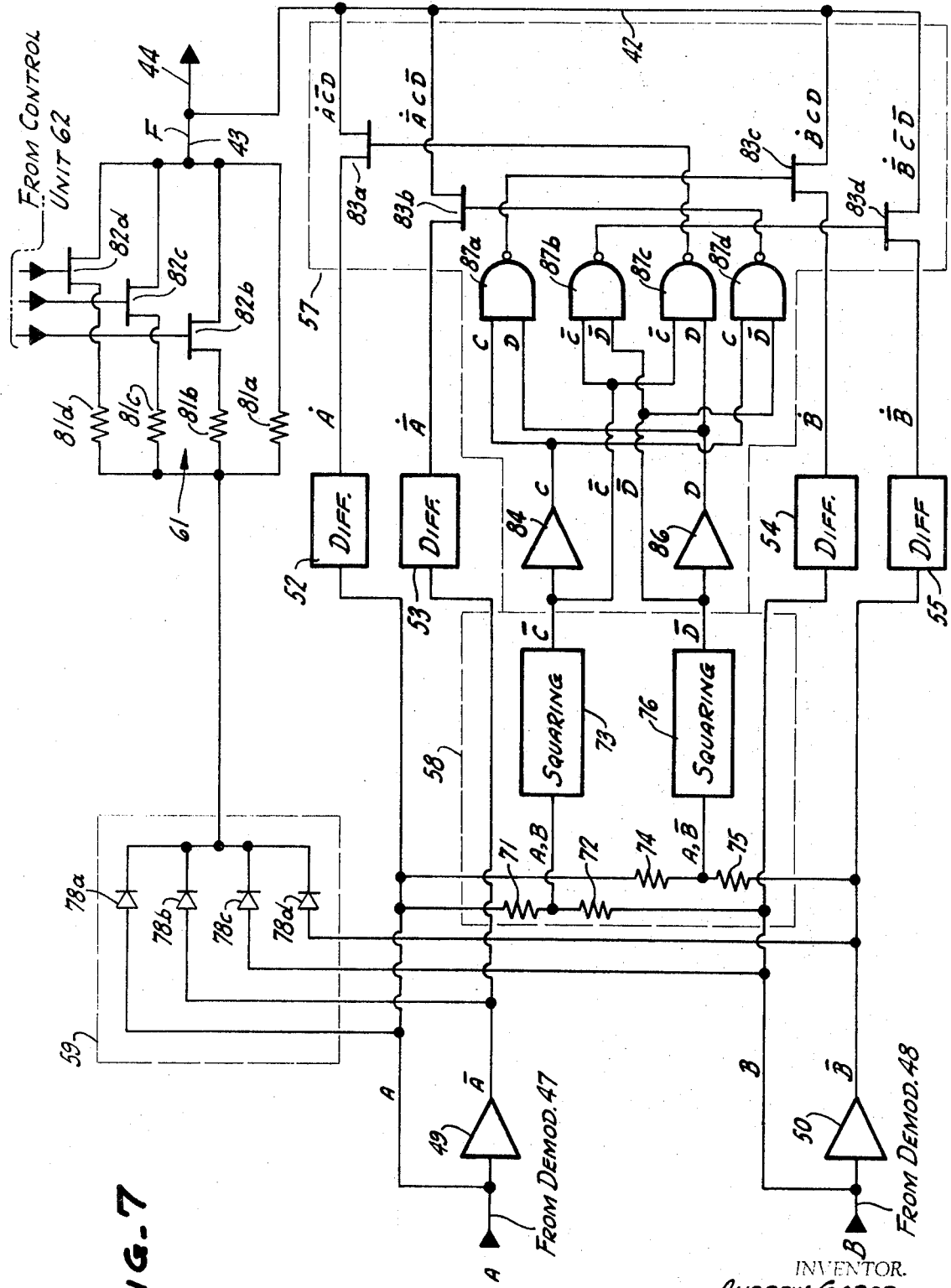
FIG. 7 is a more detailed circuit diagram of a portion of FIG. 5.

Referring now to FIG. 1, there is illustrated an overall system which utilizes the velocity measurement apparatus of the present invention. In general, this apparatus is used in a closed loop servomechanism system for positioning the heads 11 of a standard computer disk pack 12. The disk pak 12 is of standard construction consisting of five disks upon which binary information may be magnetically recorded. It includes a bottom disk 13 which has sector slots and index slots. Each disk has several information tracks. When writing on a track or reading out, the head 11 must be positioned over that particular track. This is accomplished by a head loading mechanism 14 to which heads 11 are attached and which is moved to and fro by means of a servo motor 16 which drives a shaft indicated by the broken line 17. Coupled to the shaft are two shaft pinion gears 18 and 19 which mesh with racks 21 (only one of which is shown) on head loading mechanism 14. Shaft 17 is mounted for rotation in a carriage housing 22.

Thus, the rotation of shaft 17 is an indication of the linear movement of heads 11. Means for sensing the rotary position of shaft 17 includes a transducer unit 23 having a movable portion 24 which is coupled for rotation with shaft 17 and a fixed portion 25 which is fixed to carriage housing 22.

In accordance with the invention, the heads 11 are moved to a position over a particular track of disk pack 12 as illustrated in FIG. 2. From a starting position at the origin motor 16 is accelerated to a maximum velocity at a level 26 and then decelerated in steps 27 and 28 until the heads are in proximity to the track. At this point, designated "homing region," motor 16 is gradually decelerated until it is exactly over the proper track location. The apparatus and system which is used to accomplish the acceleration and deceleration characteristics illustrated in FIG. 2 will be discussed below.

The movable and fixed portions of transducer 23 are illustrated in FIGS. 3 and 4, respectively. Movable portion 24 includes a winding 31 which has a plurality of substantially parallel conductors arranged in a circular array each series connected to the next adjacent conductor whereby adjacent conductors of the winding carry currents in opposite directions. The circular array is concentric with the axis of rotation. A high frequency oscillating carrier signal is applied to winding 31 by means of an oscillator 32. Movable portion 24 in actual practice is an insulating disk having the winding 31 deposited on it in the form of metallic layer which is then fixed to shaft 17 for rotation.

FIG. 4 illustrates the fixed portion 25 of transducer 23 which consists of a circular array of parallel conductors similarly arranged to those of movable portion 24. However portion 25 includes two sets of segmental windings 29 and 30 in spaced quadrature; in orther words, a 90° space difference. In the context of the present invention space degrees are defined as the distance between conductors with currents flowing the same direction as shown at 33. Winding 29 consists of a set of four segments 29a through d and winding 30 consists of segments 30a through d. The direction of current flow in each winding is at any instant of time indicated by the arrows shown in the phantomed portion of the windings. Thus, winding 29 is shifted from winding 30 by 90 space degrees.

The windings on movable portions 24 and 25 are juxtaposed so that they face each other as illustrated in FIG. 1. Winding 31 (FIG. 3) by reason of the high frequency signal imposed on the winding produces a voltage in both windings of FIG. 4, specifically windings 29 and 30. In this respect the two sets of windings act as a transformer. Relative movement of one of the windings with respect to the other produces a change in the output signals A' and B' of terminals A and B. Such output signals A' and B' are in the form of modulated carrier signals having as a carrier frequency the signal generated by oscillator 32. Their envelopes contain information as to both the displacement position of one winding with respect to the other, or in other words, the rotation position of shaft 17, along with velocity information. The position signals A and B as shown in FIGS. 6A and 6B which are cyclic or alternating electric signals are actually the demodulated envelopes of the signals A' and B'.

Generation of a position signal by the foregoing means is well known in the art. Basically, the position signal senses rotation by reason of the fact that when a conductor of one winding is equidistant from the two conductors of the facing winding a null will be produced. Similarly, maximum positive and negative peaks will be produced during alignment of one conductor of one winding with the conductor of the juxtaposed winding. In this manner as illustrated in FIGS. 6A and 6B the periods of the position signal are therefore inversely proportional to the relative velocity between the two windings or the absolute velocity of the shaft. In other words, more rapid rotation of the one member with respect to another will cause a greater number of alternations in the same time interval. It is also apparent that the total rotary displacement of the shaft may be determined by counting the number of alternations. Thus, the slope of the position signals at their zero crossings are proportional to instantaneous relative velocity.

Referring now specifically to the windings 29 and 30, in accordance with the present invention each winding includes four segments designated a through d with the segments in space opposition or 180°. This is apparent by the arrows associated with each winding segment. However, they are electrically interconnected to produce aiding signals. All of the windings are in a common plane. Windings 29 is electrically independent of winding 30 since they produce separate output signals at terminals A and B.

The detailed interconnection means between the windings segments, for example, 29a and 29b provide a gap for winding segment 30a which may thus be interleaved. More particularly, part of the interconnection means provides with respect to winding 29 a single conductor 34a in proximity to segment 29a which as shown conducts current in a direction opposite to the segment. A single conductor 34b conducts current opposite the direction of the current of a successive segment 29b and is on an alternate side of segment 29b as compared to 29a. This eliminates what is known as the single turn effect. Moreover, in the gap filled by segment 30a the interconnection means for windings 29a and 29b is a pair of conductors 36 having oppossed currents. Thus, the conductors interconnecting winding segments 29a and 29b will not affect or induce any currents in winding segment 30a which would cause interference and error. The remainder of the winding segments are similarly connected with some light variation in order to meet the above-outlined objectives.

Referring now to both FIGS. 5 and 6, motor 16 and transducer 23 form a part of a closed loop servomechanism system. From a broad standpoint, the position signals A and B from the output of transducer 23 are processed in a novel manner to be described below to provide a velocity signal on line 41 which is also designated "E". This signal is fed to a summing network 42. A reference signal is also derived from position signals A and B on line 43, also designated F, and is coupled to summing network 42 to produce an error signal on line 44. Line 44 is coupled to a motor driver 46 which controls the operation of motor 16.

More specifically, the A' and B' outputs of transducer 23 are respectively coupled to demodulators 47 and 48 which produce a demodulated A and B signal as shown in FIGS. 6A and 6B. These are shifted 90 space degrees from one another. The outputs of demodulators 47 and 48 are coupled to inverters 49 and 50 which provide $\overline{A}$ and $\overline{B}$ signals which have been inverted as best shown in FIGS. 6C and 6D. All four signals, A, B, $\overline{A}$ and $\overline{B}$ are coupled to their respective differentiators 52, 53, 54 and 55. The output of the differentiators 52 through 55 is shown respectively in FIGS. 6E through 6H. The dashed waveforms would be present for the reverse direction of rotation. In the idealized case where the position signals are sine waves, the differentiated signals, of course, will also be sine waves but displaced by 90°. However, the differentiation is carried on in accordance with time and therefore the peak amplitudes of the differentiated signals is equal to the slope of the position signals at their zero crossing. Thus, the signals of FIGS. 6E through 6H are velocity signals.

A unidirectional velocity ripple signal E as shown in FIG. 6K which appears on line 41 coupled to summing network is derived from the separate velocity signals by means of a commutator 57. Commutator 57 is driven by a commutating signal generator 58 coupled to the outputs of demodulators 47 and 48. Commutating signal generator 58 produces commutating logic signals C and D as illustrated in FIGS. 6I and 6J. These signals as indicated are derived from the A and B position signals. The commutating device commutates the individual velocity signals of FIGS. 6E through 6H around their maximum amplitude to provide the ripple signal shown in FIG. 6K. More particularly, the commutator 57 gates in the most positive amplitude of the signals of FIGS. 6E through 6H in accordance with the logic equation $$E = \dot{A}\overline{CD} + \dot{B}CD + \dot{\overline{A}}C\overline{D} + \dot{B}\overline{C}D$$

A reference signal, F, as shown in FIG. 6L is also drives by coupling position signals A, $\overline{A}$, B and $\overline{B}$ to a commutator 59 and in a manner similar to that of the velocity ripple signal, E, by the equation $$F = \overline{BCD} + ACD + BC\overline{D} + \overline{AC}D$$

This can be accomplished, for example, by a simple OR gate. The reference ripple signal, F, is coupled to a level control 61 and thence to summing network 42 on line 43. Comparison of the two signals E and F provides the error signal on line 44.

Since the reference ripple signal F and the velocity ripple signal E are derived from the same basic periodic position signals, it is apparent that they are similar in configuration since they both have periods proportional to the periods of the position signal. In other words, they basically have the same ripple frequency and phase. Thus, by use of the level control 61, the velocity of motor 16 can be maintained at any desired level. Moreover, drifts in the circuitry as shown in FIG. 5 are substantially cancelled out since only the ratio between the reference ripple signal and the velocity ripple signal must be maintained constant.

Level control 61 is actually a resistive attenuator and thus includes essentially only passive components. Since differentiators 52–55 are made up of passive resistor-capacitor networks, the foregoing ratio is extremely stable.

A control unit 62 is responsive to position signal A to adjust level control 61. During the time the velocity of motor 16 is at its lowest level (28, FIG. 2) the control unit also closes a homing switch 63 which couples position signal A to summing network 42. Such closure produces the homing region (see FIG. 2) where it is desired to bring the motor to a complete stop. Control unit 62 includes a counting unit in order to ascertain the absolute position of motor shaft 17. More particularly the counting unit is preset to the number of tracks from the desired position on the disk. Initially to provide a high velocity, level control 61 provides a signal of maximum amplitude. This is gradually reduced until at two or three tracks from the desired positon velocity level 28 is reached. Thereafter homing takes place when only one-half a track remains from the desired track. Details of the foregoing are disclosed and claimed in a copending application entitled "Apparatus For Controlling The Relative Position Between Two Relatively Movable Members", Ser. No. 71,894, filed Sept. 14, 1970, in the name of Andrew Gabor and assigned to the present assignee and now Pat. No. 3,663,880.

Although a transducer having two secondary windings has been illustrated in the preferred embodiment, more windings may be used for other applications if desired. On the other hand, where less accurate control is necessary, the transducer can be designed to produce only a single position signal, for example, A. This would, of course, greatly increase the ripple factor. In general, for a practical commercial device the ripple factor percentage must be maintained at 30 percent or less.

The present invention also has applications other than the disk drive field; for example, radar application, machine tool use and electric typewriters as disclosed and claimed in copending patent application Ser. No. 229,214, filed Feb. 25, 1972, in the name of Andrew Gabor, entitled "High Speed Printer With Intermittent Print Wheel And Carriage Movement" which has been abandoned in favor of continuation in part application Ser. No. 394,072, filed Sept. 4, 1973, and assigned to the present assignee. In addition, although only relative rotary motion of the transducer has been disclosed, the present invention is also applicable to linear motion.

Thus, to summarize, the present invention provides a velocity signal which is substantially continuous as opposed to the initial position signal which is cyclic and also provides a reference signal which reflects along with the velocity signal any nonlinearities in the position signal. This thus provides a closed loop servo system which operates in a smooth, non-erratic manner which is free from "buzz" or "dither" and associated heating, noise and wear.

The continuous velocity signal of the present invention as discussed above is provided by differentiating both the A and B position signals and their inverted forms to provide after commutation several segments which form a piecewise continuous velocity signal of constant polarity for each direction of velocity. Thus, the final velocity signal exhibits cusps related to the departure from perfect linearity of the cyclic position signal. Similarly, the reference signal is directly derived from the maximum amplitude of the position signals and therefore forms a proportionally cusped continuous reference signal which again reflects such nonlinearities. Thus thus provides the smooth, non-erratic operation of the present invention.

The novel apparatus of the present invention provides accuracy of greater than ±200 micro inches in the specific embodiment shown. The invention also provides a closed loop servo system which is much less expensive and more reliable because of the elimination of a tachometer which is normally necessary.

FIG. 7 illustrates typical logic circuitry which might be used for several of the blocks of FIG. 5, these blocks being indicated by similar reference numerals. All of the detailed logic circuitry of FIG. 7 represents only one mode which one skilled in the art could construct the blocks of FIG. 5.

For example, the commutating signal generator 58 performs the functions as illustrated in FIGS. 6I and 6J of summing both the A and B and the A$\overline{B}$ signals from demodulator 47 and 48 and their associated inverters 49 and 50. The A and B signals are summed by resistors 71 and 72 with their common junction coupled to a squaring circuit 73 such as a Schmitt trigger. Similarly, resistors 74 and 75 are coupled to the A and $\overline{B}$ lines respectively with their common junction coupled to a squaring circuit 76. Squaring circuits 73 and 76 provide $\overline{C}$ and $\overline{D}$ outputs which are coupled to the commutator block 57 in a manner similar to that indicated in FIG. 5.

Commutator 59 as previously suggested is a simple OR gate including the diodes 78a–d. As discussed above, the output of the OR gate 59 provides a reference signal which is directly derived from the maximum amplitudes of the position signals. As is apparent from inspection of the waveforms of FIG. 6, the OR gates provide a transition between maximum aplitudes at the 45° points of the waveform. These 45° points are the same points provided by the commutating logic signals C and D in FIGS. 6I and 6J. Thus, although the logic equation for the signal F on line 5 of page 10 includes the C and D commutating signals, in practice the use of such signals are not necessary in generating the desired reference ripple signal, F.

The level control 61 is essentially a resistive attenuator, as discussed above, where the various resistors 81a through 81d may be selectively connected in parallel by the associated field effect transistors 82b, 82c and 82d. These field effect transistors would be driven from control unit 62 as illustrated in FIG. 5.

Block 57 is the commutator which provides the velocity ripple signal, E. It includes four field effect transistors 83a-d with their source terminals respectively coupled to the output differentiators 52 through 55 as also illustrated in FIG. 5. Gating of field effect transistors 83a-d is provided by the $\overline{C}, \overline{D}$ signals from commutating signal generator 58. This gating gates in the most positive amplitude of the signals of FIGS. 6C through 6H in accordance with the logic equation shown above at page 9. The terms of this logic equation are individually set out at the output terminals of field effect transistors 83a-d. The specific gate inputs for these field effect transistors are derived from inverters 84 and 86 which provide C and D signals in addition to the existing $\overline{C}, \overline{D}$ signals, and AND gates 87a through 87d which have as inputs the commutating signals arranged in such a manner as to provide the logic terms illustrated. All of these output terminals of field effect transistors 83a-d are coupled to a common line 42 which serves as the summing network shown in FIG. 5. When coupled to the reference output 43 from level control 61 an error signal is produced on line 44 which drives the motor driver 46 of FIG. 5.

The foregoing showing of FIG. 5 is illustrative only of merely one mode in which one skilled in the art could construct the circuit of FIG. 5. As is apparent, the logic blocks of the commutators 59 and 57 are fully standard in the art and the same logic as produced by the foregoing Boolean equations can be accomplished in several different ways.

I claim:

1. Apparatus for the measurement of relative velocity between two relatively movable members comprising: a winding coupled to one of said members including a plurality of substantially parallel conductors each series connected to its next adjacent conductor whereby adjacent conductors of the winding carry currents in opposite directions; a winding coupled to the other of said members including a plurality of substantially parallel conductors each series connected to its adjacent conductor; means for applying an electric signal to one of said windings; and means for juxtaposing said windings in an inductive relationship for producing an electric alternating position signal from said other winding in response to relative movement between the winding said electric signal of said one winding inducing said position signal in said other winding, said position signal having periods inversely proportional to the relative velocity between said members, the peak amplitude of said position signal being substantially constant with changes in velocity and the slope of said position signal at its zero crossing being proportional to instantaneous relative velocity; means for deriving from said slope information of said position signal a velocity signal whose magnitude is related to velocity, means for deriving a reference signal from said position signal said reference signal having periods proportional to said periods of said position signal, and means for comparing said reference signal with said velocity signal to provide an error signal.

2. Apparatus as in claim 1 where said deriving means for said velocity signal includes means for differentiating said position signal with respect to time to provide a velocity signal whose maximum instantaneous magnitudes are proportional to instantaneous velocity.

3. Apparatus as in claim 1 together with servomotor means responsive to said error signal and coupled to a load to which one of said relatively movable members is mechanically connected.

4. Apparatus as in claim 1 in which said relatively movable members move in rotation and said windings comprise circular arrays of substantially parallel conductors, said circular arrays being concentric with the axis of said rotation.

5. Apparatus as in claim 1 together with at least one additional winding on said other member in predetermined space phase to provide an additional position signal.

6. Apparatus as in claim 5 where said winding on said other member and said additional winding are interleaved in substantially a common plane, such windings also being electrically independent of each other.

7. Apparatus as in claim 6 where each of said windings include four segments in space phase opposition but include electrical interconnection means to produce aiding signals said interconnection means providing gaps between segments for the interleaving of the other of said windings said interconnection means providing a single conductor in proximity to said segments which conducts current in a direction opposite to said segment, said single conductor also being located on alternate sides of successive segments of a winding said interconnection means also bridging said gaps by a pair of conductors having opposed currents.

8. Apparatus for the measurement of relative velocity between two relatively movable members comprising; a first winding coupled to one of said members including a plurality of substantially parallel conductors each series connected to its next adjacent conductor whereby adjacent conductors of the winding carry currents in opposite direction; means for applying an electric signal to said first winding; a plurality of windings coupled to said other of said members said windings being arranged in a predetermined space phase with respect to each other; means for juxtaposing said windings in an inductive relationship for respectively producing electric alternating position signals from said plurality of windings in response to relative movement between the windings, said electric signal of said one winding inducing said position signal in said other windings, said position signals having periods inversely proportional to the relative velocity between said members the peak amplitude of said position signals being substantially constant with changes in velocity and the slope of said position signals at their zero crossing being proportional to instantaneous relative velocity; means for deriving a velocity signal from said slope information of said position signals including means for differentiating said position signals with respect to time to provide a plurality of velocity signals in said predetermined space phase whose maximum instantaneous magnitudes are proportional to instantaneous velocity; means for commutating said velocity signals around their maximum amplitudes to provide a unidirectional velocity ripple signal; means for deriving a reference signal from said position signals including means for sampling the peak amplitudes of said position signal to provide a unidirectional reference ripple signal similar to said velocity ripple signal; and means for comparing said velocity ripple signal with said reference ripple signal to provide an error signal.

9. Apparatus as in claim 8 where said plurality of windings consists of second and third windings which are in space quadrature.

10. Apparatus as in claim 8 together with means for inverting at least a portion of said velocity signals and commutating such signal along with the non-inverted velocity signals.

11. Apparatus for the control of relative position and relative velocity between two relatively movable members comprising: transducer means coupled to said movable members producing an electric alternating position signal having periods inversely proportional to the velocity between said members, the peak amplitudes of said position signal being substantially constant with changes in velocity and the slope of said position signal at its zero crossing being proportional to instantaneous relative velocity, means for deriving from said slope information of said position signal a velocity signal said deriving means including means for differentiating said position signal with respect to time to provide said velocity signal whose maximum instantaneous magnitudes are proportional to instantaneous velocity and which provides a continuous indication of velocity, means for deriving a reference signal from said position signal said reference signal having periods proportional to said periods of said position signal and an amplitude proportional to the amplitude of said position signal, means for comparing said reference signal with said velocity signal to provide an error signal, and motor means for providing said relative velocity between said two movable members said motor means being responsive to said error signal to vary said relative velocity in a manner to minimize said error signal said continuous indication of velocity maintaining, in cooperation with said reference signal, said relative velocity at a desired level.

12. Apparatus as in claim 11 including means for adjusting said reference signal for controlling said relative velocity and together with homing switch means for coupling said position signal to said comparing means for causing said relative velocity to be reduced to zero.

13. Apparatus as in claim 11 including commutating means for commutating said peak amplitudes of said position singal to provide said reference signal and for commutating the peak amplitudes of the differentiated position signal for providing said velocity signal.

14. Apparatus as in claim 11 where said position signals are in the form of mudulated carriers together with means for demodulating such signals.

15. Apparatus as in claim 11 where said velocity signal deriving means includes commutating means driven by said position signal for selecting segments of said differentiated position signal around the maximum amplitudes of such differentiated signal said commutating means combining such segments in a piecewise continuous velocity signal of constant polarity for each direction of velocity, and together with commutating means included in said means for deriving said reference signal for selecting segments around the maximum amplitude of said position signal to form a piecewise continuous reference signal.

16. Apparatus as in claim 2 where said deriving means includes commutating means for selecting segments of said differentiated position signal around the maximum amplitudes of such differentiated signal said commutating means combining such segments in a piecewise continuous velocity signal of constant polarity for a single direction of velocity.

17. Apparatus for the control of relative position and relative velocity between two relatively movable members comprising: transducer means coupled to said movable members producing an electric alternating position signal in response to said relative movement, said position signal having periods inversely proportional to the velocity between said members, the peak amplitude of said position signal being substantially constant with changes in velocity and the slope of said position signal at its zero crossing being proportional to instantaneous relative velocity, means for deriving from said slope information of said position signal a velocity signal whose maximum instantaneous magnitUdes are proportional to instantaneous velocity and which provides a continuous indication of velocity, means for deriving a reference signal from said position signal said reference signal having periods proportional to said periods of said position signal and an amplitude proportional to the amplitude of said position signal, and means for comparing said reference signal with said velocity signal to provide an error signal said continuous indication of velocity maintaining, in cooperation with said reference signal, said relative velocity at a desired level.

18. Apparatus as in claim 17 where said deriving means includes means for differentiating said position signal with respect to time and commutating means for selecting segments of said differentiated position signal around the maximum amplitudes of such differentiated signal said commutating means combining such segments in a piecewise continuous velocity signal of constant polarity for a single direction of velocity.

19. Apparatus as in claim 17 where said means for deriving said reference signal includes commutating means for selecting segments around the maximum amplitudes of said position signal to form a piecewise continuous reference signal.

20. Apparatus as in claim 17 where said transducer means produces at least two position signals in space phase and said velocity and reference signals are derived from such position signals.

* * * * *